Dec. 8, 1970   F. HORNSTRA, JR., ET AL   3,546,577
APPARATUS FOR NONDESTRUCTIVELY MEASURING THE
POSITION AND PARTICLE-DENSITY PROFILE
OF AN ACCELERATOR BEAM
Filed June 26, 1968   5 Sheets-Sheet 1
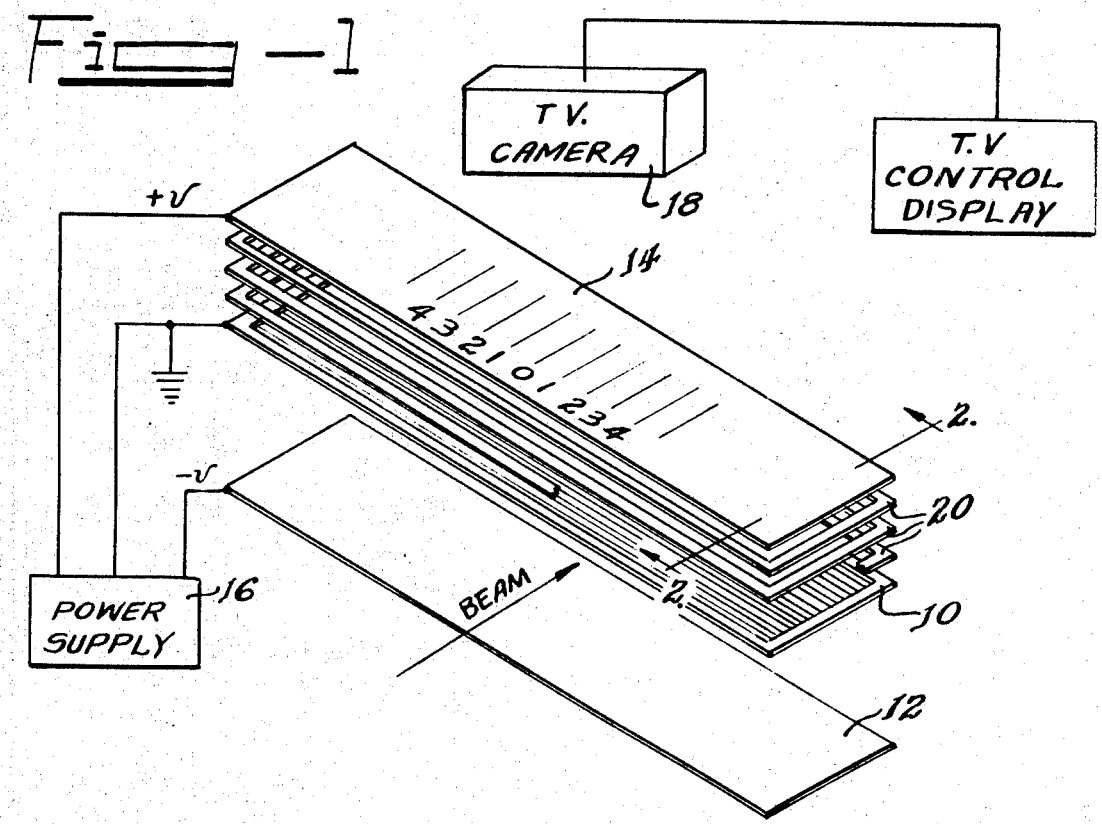
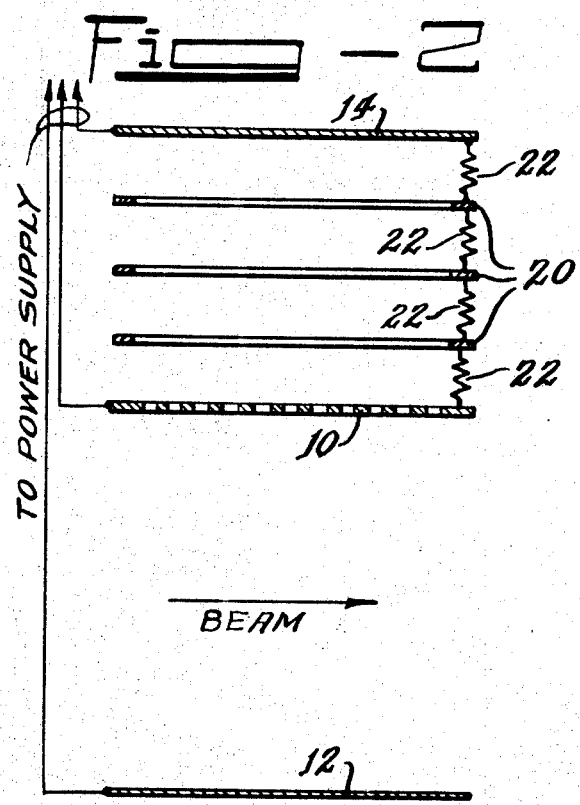
Inventors
Fred Hornstra, Jr.
William H. DeLuca
Attorney

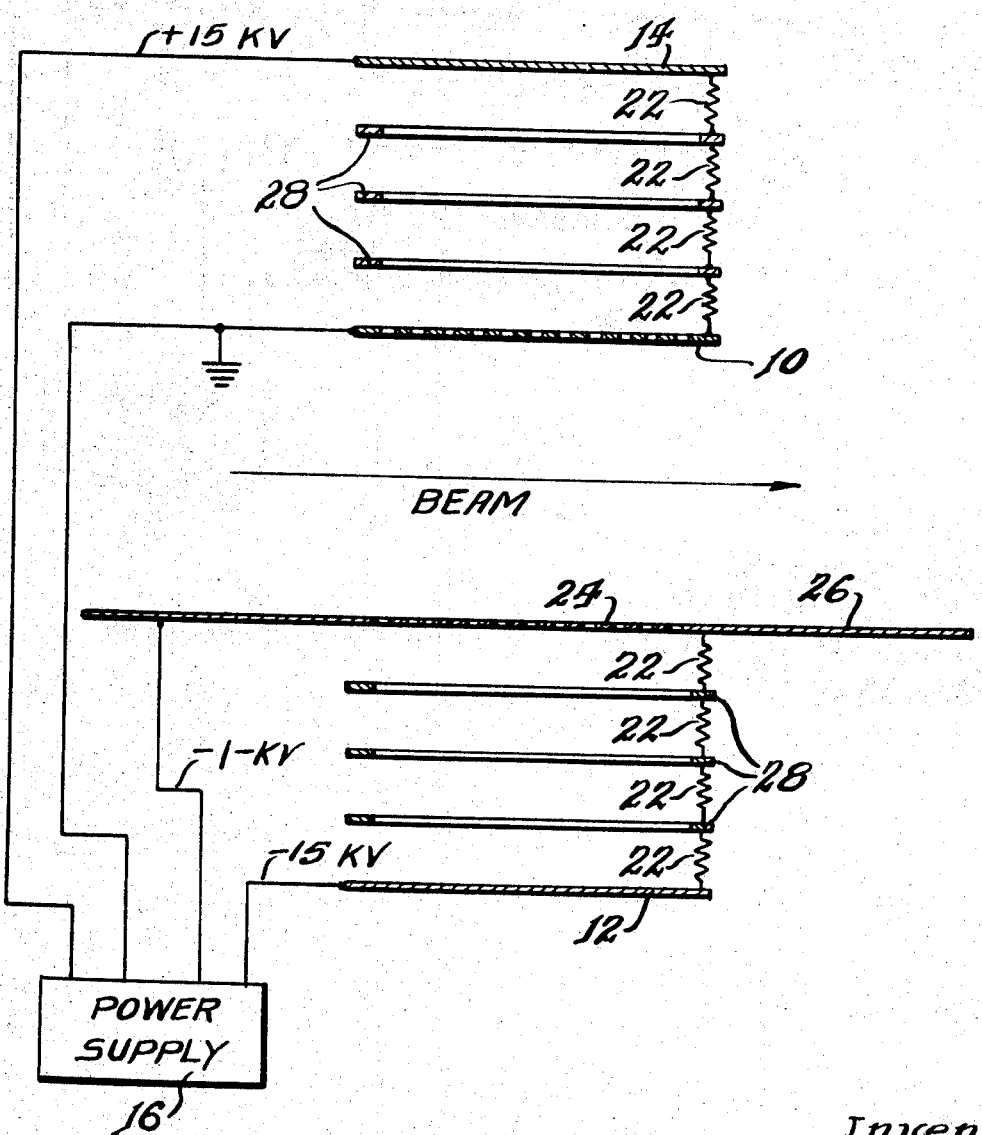

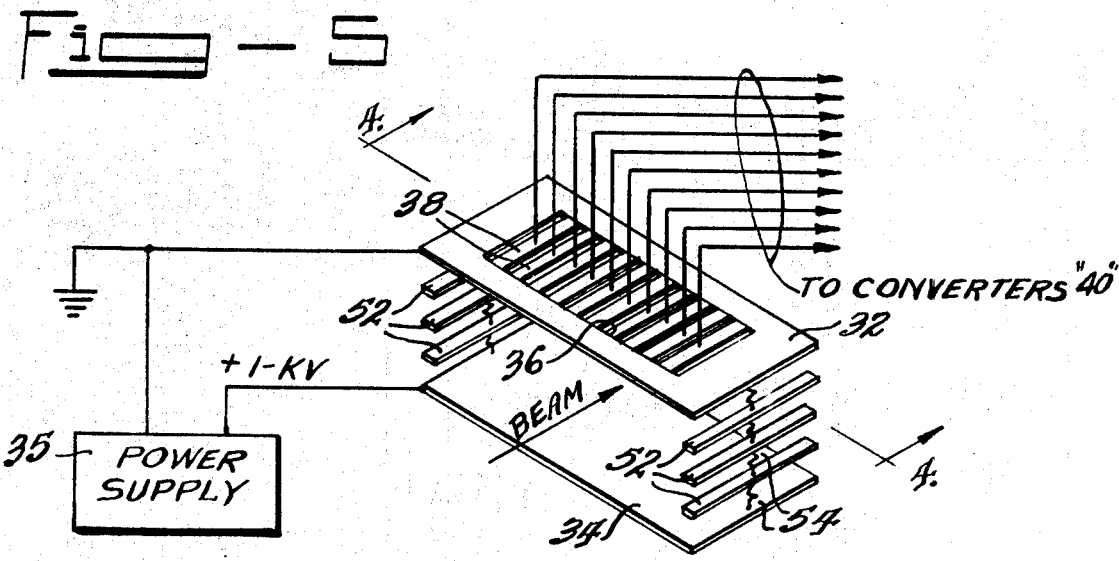
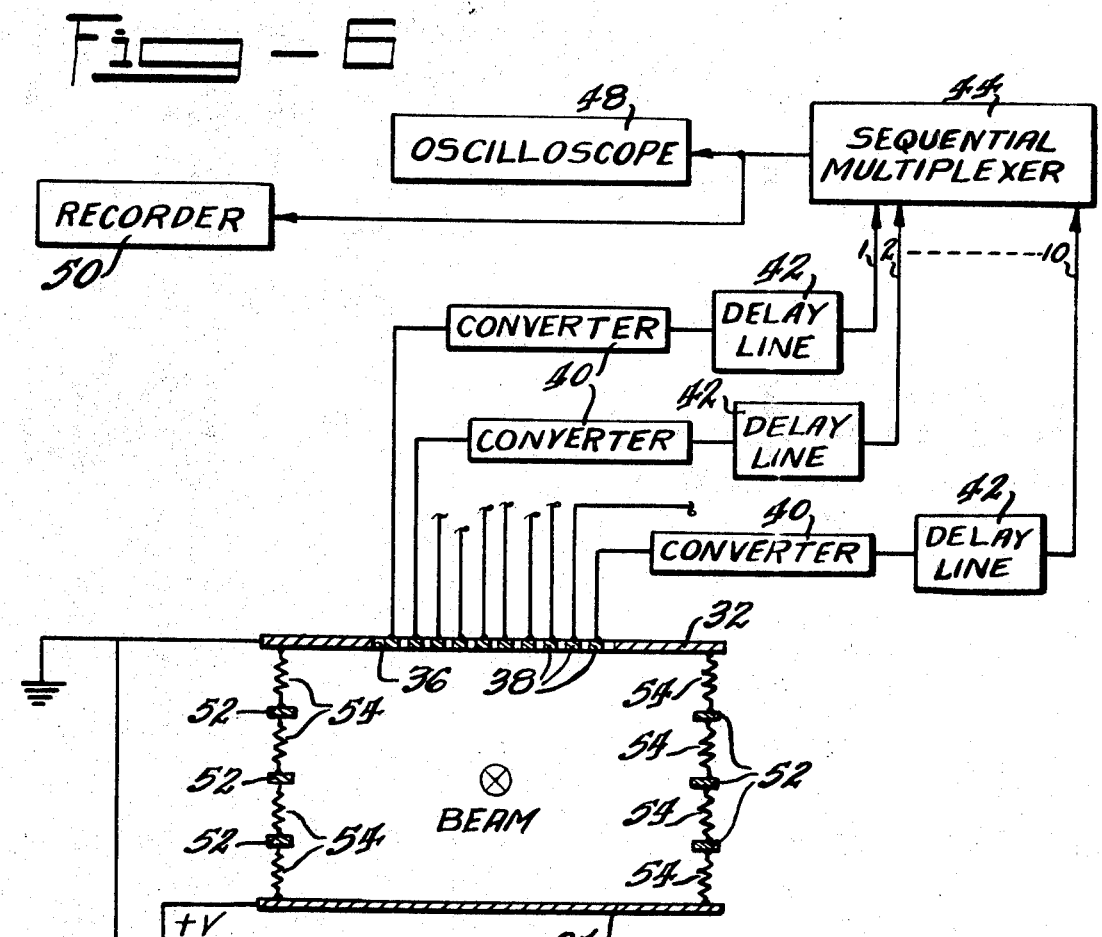

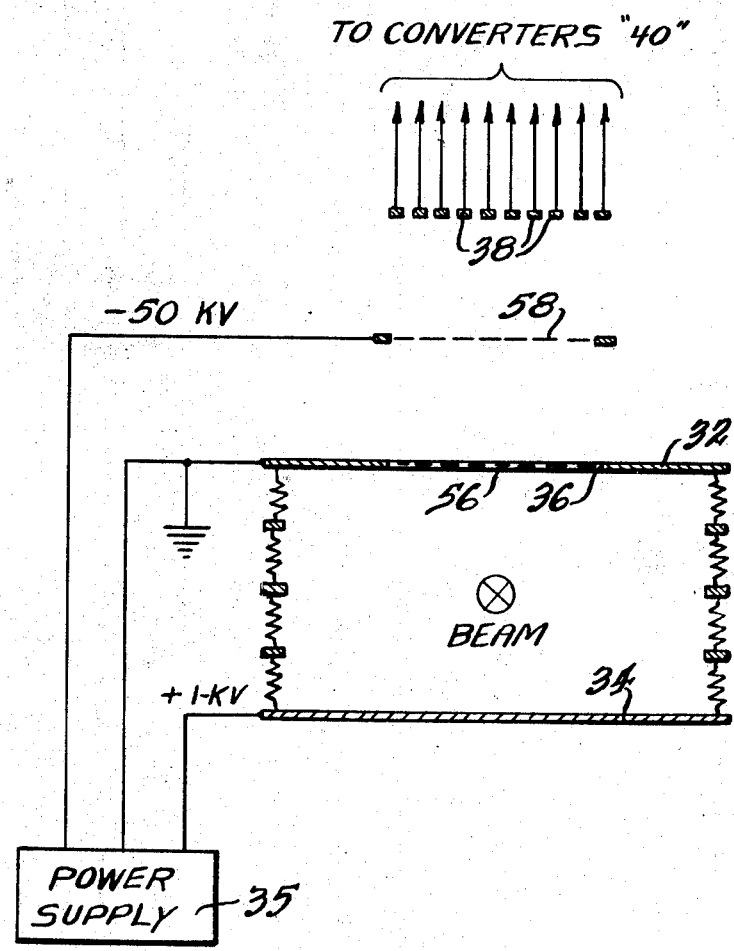

United States Patent Office 3,546,577
Patented Dec. 8, 1970

3,546,577
APPARATUS FOR NONDESTRUCTIVELY MEASURING THE POSITION AND PARTICLE-DENSITY PROFILE OF AN ACCELERATOR BEAM
Fred Hornstra, Jr., Naperville, and William H. de Luca, Hinsdale, Ill., assignors to the United States of America as represented by the United States Atomic Energy Commission
Filed June 26, 1968, Ser. No. 740,207
Int. Cl. G01n 27/62
U.S. Cl. 324—33      12 Claims

ABSTRACT OF THE DISCLOSURE

An apparatus for nondestructively measuring the position and particle-density profile of an accelerator beam operating in a residual gas of a partial pressure wherein the accelerator beam ionizes the residual gas includes a pair of electrodes mounted parallel to the plane of the accelerator beam on opposing sides thereof. A voltage source applies a potential between the electrodes to generate an electric field normal to the plane of the accelerator beam wherein the residual gas ions are accelerated. Ion-collecting means are mounted to intercept the accelerated residual gas ions to provide a profile measure of the accelerator beam.

CONTRACTUAL ORIGIN OF THE INVENTION

The invention described herein was made in the course of, or under, a contract with the United States Atomic Energy Commission.

BACKGROUND OF THE INVENTION

This invention relates to devices for determining the properties of an accelerator beam and more specifically to devices for nondestructively determining accelerator beam position and particle-density profiles.

The measurement of the properties of accelerator beams in heavy ion accelerators generally involves intercepting a portion of the beam by destructive diagnostic equipment, such as slits and Faraday cups. Such devices are undesirable where it is desired to avoid destroying the beam. Further, the devices provide information which is limited in value, since dynamic measurements therewith are virtually impossible.

Accordingly, it is one object of the present invention to provide a nondestructive beam particle-density-profile monitor.

It is another object of the present invention to provide a device for continuously monitoring the position of an accelerator beam.

It is another object of the present invention to provide a device which will nondestructively determine the position and particle-density profile of an accelerator beam.

It is another object of the present invention to provide an improved accelerator beam-measuring device.

Other objects of the present invention will become more apparent as the detailed description proceeds.

The apparatus of the present invention nondestructively measures the position and particle-density profile of an accelerator beam operating in a residual gas of a partial pressure, wherein the accelerator beam ionizes the residual gas. The invention generally comprises means for generating an electric field to accelerate the residual gas ions in a predetermined direction and means are provided for measuring the spatial distribution of the accelerated residual gas ions, wherefrom a profile of the accelerator beam is obtained.

BRIEF DESCRIPTION OF THE DRAWINGS

Further understanding of the present invention may best be obtained from consideration of the accompanying drawings wherein:

FIG. 1 is a sketch of an apparatus for the practice of the present invention.

FIG. 2 is an enlarged section of the apparatus of FIG. 1 along line 2—2.

FIG. 4 is an enlarged section of the apparatus of FIG. 3 along line 3—3.

FIG. 5 is a sketch of an alternate apparatus for the practice of the present invention.

FIG. 6 is an enlarged section of the apparatus of FIG. 5 along line 5—5.

FIG. 7 is a sectional view of an alternate apparatus for the practice of the present invention in the same plane as FIG. 6.

Figure 3:
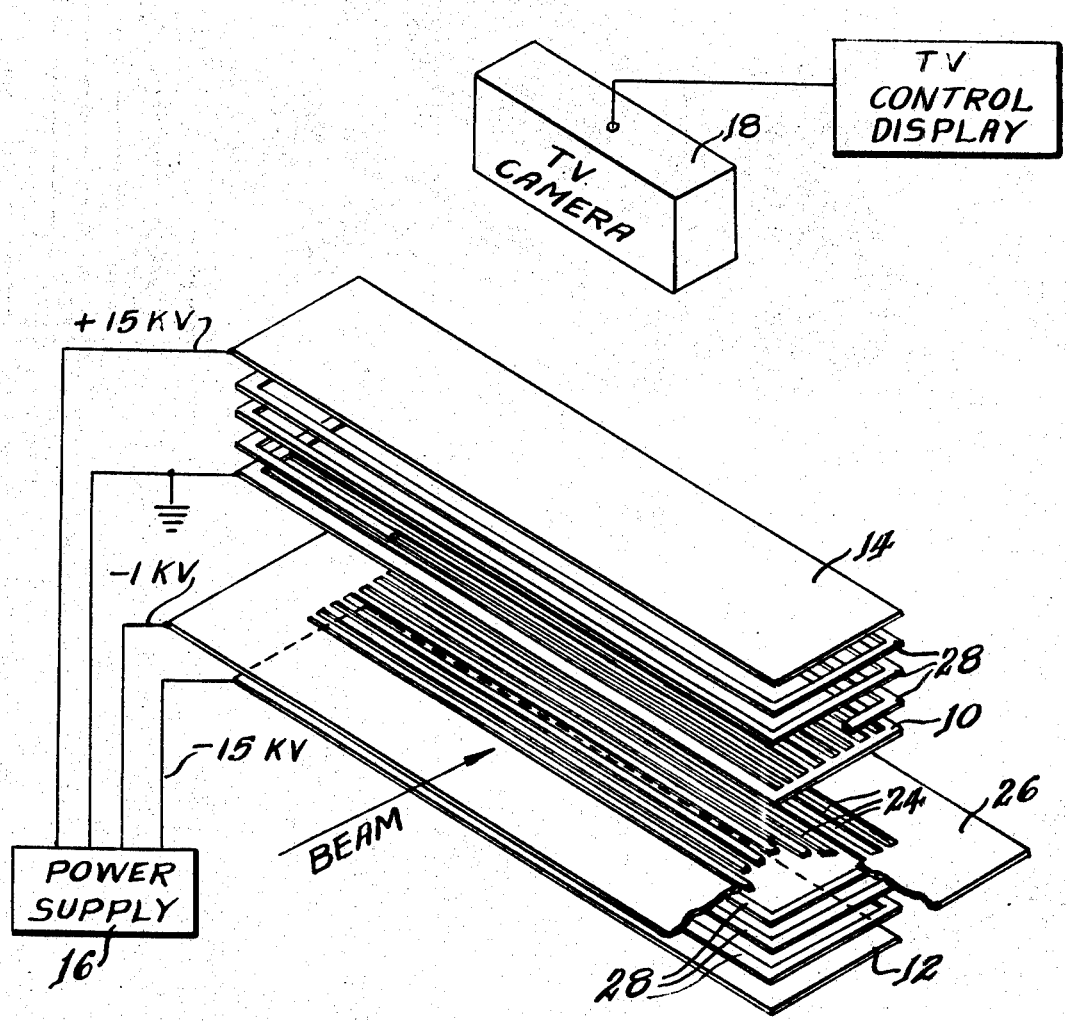
FIG. 3 is a sketch of an alternate apparatus for the practice of the present invention.

The vacuum chamber of a proton accelerator typically operates at a pressure of $10^{-6}$ torr. At this pressure, approximately $3.2 \times 10^{16}$ gas molecules per cubic meter exist. A number of these gas molecules are ionized by the accelerator beam. Using the Sternheimer range-energy relationship for 12 gev. protons in air and assuming that 30 ev. of energy are required to form an ion pair, a circulating beam current of 300 milliamperes (corresponding to approximately $1 \times 10^{12}$ protons) in an accelerator such as the Zero Gradient Synchrotron at Argonne National Laboratory will liberate $1.9 \times 10^{13}$ ion pairs per second per meter length of proton beam in a gas pressure of $1 \times 10^{-6}$ torr. These liberated charged particles provide a measure of the properties of the accelerator beam, the number of liberated charged particles in a given volume being proportional to the amount of proton beam in that volume. The present invention utilizes these liberated charged particles.

In FIGS. 1 and 2, within the cavity of the accelerator, a pair of electrodes 10 and 12 are mounted on opposing sides of the accelerator beam parallel to the plane thereof. The top electrode 10 is of a grid structure. An aluminized phosphor screen 14 is mounted above the grid-structured electrode 10 parallel thereto. A power supply 16 applies a positive voltage to the phosphor screen 14 and a negative voltage to the electrode 12. The grid-structured electrode 10 is maintained at ground potential.

In operation, as the accelerator beam passes between the electrodes 10 and 12, it will ionize the residual gas, as hereinbefore described, to provide ion pairs of a positive ion and a negative ion (electron). The voltages applied to the electrodes 10 and 12 and to the phosphor screen 14 establish an electric field therebetween in which these ions are accelerated. With a high positive voltage applied to the phosphor screen 14 (approximately 15 kv.), the grid-structured electrode 10 at ground potential and a negative voltage applied to the electrode 12 (approximately —1 kv.), a large negative ion accelerating electric field is created for the phosphor screen 14, while a small electric field is maintained across the accelerator beam. Negative ions produced by the accelerator beam are thus accelerated normal to the beam to strike the phosphor screen and emit light therefrom, the amount of light and position thereof indicating the density and position of the accelerator beam.

The phosphor is aluminized on the screen 14 to provide a conducting surface, to provide more emitted light since back-scattered light is reflected by the aluminum coating, and to protect the phosphor from contamination. The light emitted from the phosphor screen may be viewed by a television camera 18 to provide remote viewing thereof. With television-type readout, it is preferred that the phosphor be chosen to have a spectral emission which closely matches the spectral sensitivity of the vidicon tube in the television system.

To eliminate stray electrostatic fields at the edges of the electrodes, a plurality of guard rings 20 with divider resistors 22 may be used, as shown. The electrodes 10 and 12 and the phosphor screen 14 are aligned with respect to each other and are of generally the same size. The spacing between the electrodes 10 and 12 and phosphor screen 14 is not critical. It has only to be sufficient to hold off the postaccelerating voltage so that arc-back does not occur.

In FIGS. 3 and 4, a modified embodiment of the apparatus of FIGS. 1 and 2 is shown. In this embodiment, improved light readout from phosphor screen 14 is effected.

In the embodiment of FIGS. 3 and 4, a second grid-structured electrode 24 is mounted between the proton beam and electrode 12 parallel thereto. A shielding electrode 26 is mounted coextensive with the grid-structured electrode 24, as shown.

In operation, the proton beam, as hereinbefore described, produces ion pairs of positive ions and negative ions. The power supply 16 is connected to provide a positive high voltage to the phosphor screen 14, a negative voltage to the shielding electrod 26 and grid-structured electrode 24 and a negative high voltage to the electrode 12. The grid-structured electrode 10 is maintained at ground potential. These voltages establish an electric field wherin the formed positive ions and negative ions are accelerated, as will be appreciated. The positive high voltage (+15 kv.) applied to the phosphor screen 14 and the ground potential of the grid-structured electrode 10 accelerates the negative ions from the ionized residual gas to the phosphor screen 14, which they strike and emit light thereby. The negative high voltage (−15 kv.) applied to the electrode 12 and the negative voltage (−1 kv.) applied to the grid-structured electrode 24 and shielding electrode 26 accelerate the positive ions from the residual gas to the electrode 12. These voltages are such that the accelerated positive ions strike the electrode 12 and release therefrom secondary electrons. These secondary electrons are accelerated to the phosphor screen 14 by positive high potential thereon. The secondary electrons strike the phosphor screen 14 and emit light to reinforce the light emitted by the primary accelerated negative ions to give improved light readout. The shielding electrode 26 extending beyond the grid-structured electrode 24 shields the electrode 12 from positive ions formed by the accelerator beam outside of the volume between the phosphor screen 14 and the electrode 12. Thus, positive ions exterior to the volume defined by the electrode 12 and screen 14 are prevented from striking the electrode 12 and producing secondary electrons which would give a false reading to the light emitted from the phosphor screen 14.

As in the embodiment of FIGS. 1 and 2, guard rings 28 may be added to prevent fringing electrostatic fields between the respective electrodes. The guard rings 28 are separated by resistors 22, as in the embodiment of FIGS. 1 and 2. In the embodiment of FIGS. 3 and 4, the electrodes 10, 12 and 24 and phosphor screen 14 are aligned with respect to each other and are of approximately the same cross-sectional area. The shielding electrode 26 extends beyond the grid-structured electrode 24 a distance sufficient to protect the electrode 12 from positive ions exterior to the volume defined by the electrode 12 and screen 14. A distance of approximately 6 inches on each side of the grid-structured electrode 24 has been found sufficient to accomplish this purpose. Spacing between the electrodes, as before, need only be such as to hold off the postaccelerating voltage and inhibit arc-back.

In the embodiment of FIGS. 3 and 4, the aluminized phosphor screen 14 may be viewed by a television system, as for the embodiment of FIGS. 1 and 2, in which case it is preferred that the phosphor of screen 14 have a spectral emission which closely matches the spectral sensitivity of the vidicon tube of the television system. With the embodiment of FIGS. 3 and 4, approximately twice the light output is obtained from the phosphor screen 14 to illustrate the beam position and intensity than is obtained from the embodiment of FIGS. 1 and 2. Thus, the embodiment of FIGS. 3 and 4 is preferred over the embodiment of FIGS. 1 and 2 to obtain a profile of the accelerator beam.

Turning to FIGS. 5 and 6, an alternate embodiment of an apparatus for the practice of the present invention is shown. Within the cavity of the accelerator a pair of electrodes 32 and 34 are mounted on opposing sides of the accelerator beams parallel to the plane thereof. A power supply 35 provides a voltage to the electrodes 32 and 34 to establish an electric field therebetween wherein ions are accelerated. Electrode 32 has an aperture 36 therethrough. A plurality of strip electrodes 38 are mounted in the aperture 36 spatially with respect to each other and the electrode 32. Each of the strip electrodes 38 is connected to an associated current-to-voltage converter 40. Each of the current-to-voltage converters is of conventional design comprising an operational amplifier with feedback resistor network and having an inverting and noninverting input. The output from each strip electrode 38 is fed to the inverting input of the associated operational amplifier while the noninverting input thereof is maintained at ground potential. The output of each of the current-to-voltage converters 40 is fed through a delay line 42 to a conventional sequential multiplexer 44 whose output is in turn fed to an oscilloscope 48 and a recorder 50.

In operation, the accelerator beam, as hereinbefore, ionizes the residual gas to form ion pairs. The power supply 35 applies a positive voltage (approximately 1 kv.) to the electrode 34, while the electrode 32 is maintained at ground potential. The established potential between the electrodes 32 and 34 accelerates positive ions formed form the residual gas to the strip electrodes 38. The operational amplifier of the current-to-voltage converter 40 operates to hold the strip electrodes 38 at ground potential so that accelerated ions will strike the strip electrodes and cause a flow therein ion current, the amount of ion current generated in each of the strip electrodes 38 being indicative of the position and intensity of the accelerator beam. The current-to-voltage converters 40 each convert the ion current in the associated strip electrode 38 to a voltage and apply the voltage through the associated delay line 42 to the sequential multiplexer 44. The sequential multiplexer 44 scans the output of each of the converters 40 to obtain a scan of the ion current in each of the electrode strips and a resultant accelerator beam profile. The multiplexer 44 starts at channel 1 and sequentially samples each channel for approximately 1 microsecond. Since the multiplexer samples each channel for approximately 1 miscrosecond, the scanning of the 10 channels illustrated will give a 10-microsecond spread in the analog sampled output. This time spread is eliminated by adjusting the time delay 42 in each channel so that the multiplexer sequentially reads a signal having the same generation point in time. Thus, the delay lines 42 are set for a delay ranging from 0 to 9 microseconds for the respective strip electrodes 38 whereby the multiplexer output corresponds to an instantaneous 1-microsecond sample of the accelerator beam profile. The output of the multiplexer 44 is fed to an oscilloscope 48 and recorder 50 for readout.

To eliminate fringing electrostatic fields between the electrodes 32 and 34, guard bars (rings) 52 having resistors 54 therebetween may be used, as shown. It will be appreciated that the polarity of the voltage supply 35 may be reversed so that electrode 34 has a negative voltage applied thereto whereby negative ions are attracted to the strip electrodes 38. It is preferred for the operation of the embodiment of FIGS. 5 and 6 that the electrode 34 be maintained at a positive potential to attract positive ions to the strip electrodes 38, since lower values of electrode high voltage are needed for the beam detection in this mode of operation.

It is to be noted that, since the ion production rate at any point within the beam is proportional to the beam current density at that location, the ion current collected by each segment of the strip electrodes 38 will be proportional to the instantaneous beam current in the corresponding section of the accelerator beam. A simultaneous sampling of the ion current being detected by each of the strip electrodes 38 thereby provides an instantaneous one-dimensional beam density profile.

In FIG. 7, a modification to the embodiment illustrated in FIGS. 5 and 6 is shown. A grid structure 56 is inserted in the aperture 36 of the electrode 32 so as to be in electrical contact therewith. The strip electrodes 38 are mounted spatially with respect to each other above the grid structure 56 of electrode 32. A grid-structured electrode 58 is mounted between the strip electrodes 38 and the grid structure 56 of electrode 32 parallel with respect thereto. The remainder of the embodiment of FIG. 7 is the same as that shown in FIGS. 5 and 6. In operation, the electrode 34 has a positive voltage (1 kv.) applied thereto from power supply 35 and the electrode 32 and its grid structure 56 are maintained at a ground potential. The power supply 35 applies a negative voltage (—50 v.) to the grid-structured electrode 58. The operational amplifier current-to-voltage converter 40 maintains each of the associated strip electrodes 38 at essentially ground potential as before. Thus, positive ions from the residual gas are accelerated to the strip electrodes 38 to generate an ion current therein, as hereinbefore described for the embodiment of FIGS. 5 and 6. The grid structure 56 in electrode 32 shields the strip electrodes 38 from electrostatic charges resulting from the electrostatic field of the accelerator beam. The grid-structured electrode 58 with a negative voltage (—50 v.) repels any secondary electrons emitted from the strip electrodes 38 back to the strip electrodes 38. The remaining operation of the embodiment of FIG. 7 is the same as for the embodiment of FIGS. 5 and 6. It is to be noted that with the structure of the embodiment of FIG. 7 improved ion sensitivity and collection result over the embodiment of FIGS. 5 and 6.

In each of the embodiments of FIGS. 5, 6 and 7, the electrodes are of approximately the same size and are aligned with respect to each other. It will be appreciated that in all of the embodiments, to obtain a full profile of the accelerator beam, it is necessary that the phosphor screen and the strip electrodes have an effective area greater than the cross section of the beam in the plane thereof.

Persons skilled in the art will, of course, readily adapt the general teachings of the invention to embodiments far different from the embodiments illustrated. Accordingly, the scope of the protection afforded the invention should not be limited to the particular embodiments illustrated in the drawings and described above but should be determined only in accordance with the appended claims.

The embodiments of the invention in which an exclusive property or privilege is claimed are defined as follows:

1. In a particle accelerator including a particle beam accelerated in a residual gas of partial pressure which gas is ionized by said particle beam the combination with said residual gas ions of means for generating an electric field to accelerate said residual gas ions in a predetermined direction apart from said particle beam while essentially maintaining the spatial distribution of said ions relative to each other, and means for measuring the spatial distribution of said accelerated residual gas ions, which spatial distribution is a measure of the profile of said particle beam.

2. The apparatus according to claim 1 wherein said ion spatial-distribution-measuring means comprise a prosphor screen mounted to intercept said accelerated residual gas ions.

3. The apparatus according to claim 1 wherein said ion spatial-distribution-measuring means comprise a plurality of strip electrodes spatially mounted with respect to each other and disposed to intercept said accelerated residual gas ions, and means for measuring the ion current in each of said strip electrodes.

4. The apparatus according to claim 1 wherein said electric-field-generating means comprise first and second electrodes mounted parallel to the plane of said accelerator beam on opposing sides thereof, and means for generating and applying a voltage to said electrodes to generate an electric field therebetween whereby said residual gas ions are accelerated in a direction normal to the plane of said accelerator beam.

5. The apparatus according ot claim 4 wherein said first electrode is of a grid structure, said ion spatial-distribution-measuring means comprise a phosphor screen mounted parallel to said grid-structure first electrode with said grid-structured first electrode between said accelerator beam and said phosphor screen, and said voltage means generate and apply a voltage to said electrodes and said phosphor screen to accelerate said residual gas ions to said phosphor screen.

6. The apparatus according to claim 5 further including a grid-structured third electrode spatially mounted between said second electrode and said accelerator beam parallel with respect thereto, and said voltage means generate and apply a voltage to said first electrode and said phosphor screen to accelerate negative ions from said residual gas ions to said phosphor screen and a voltage to said second and third electrodes to accelerate positive ions from said residual gas ions to said second electrode to release secondary electrons therefrom and permit the acceleration of said secondary electrons to said phosphor screen.

7. The apparatus of claim 6 further including guard ring means interposed of said phosphor screen and said first electrode and said second and third electrodes, and means for shielding said third electrode from positive residual gas ions external of the area between said third electrode and said accelerator beam.

8. The apparatus of claim 4 wherein said first electrode has an aperture therethrough, a plurality of strip electrodes mounted within said aperture spatially with respect to each other and said apertured first electrode, said voltage means generate and apply a voltage to said first and second electrodes to accelerate said residual gas ions to said strip electrodes, means for maintaining said strip electrodes at essentially the same potential as said first electrode, and means for measuring ion current flowing in each of said strip electrodes.

9. The apparatus of claim 8 wherein said first electrode and said strip electrodes are maintained essentially at ground potential and said voltage means applies a positive voltage to said second electrode whereby positive ions for said residual gas ions are accelerated to said strip electrode.

10. The apparatus according to claim 9 further including a plurality of guard ring means interposed of said first and second electrodes.

11. The apparatus according to claim 4 wherein said first electrode is of a grid structure, said ion spatial-distribution-measuring means comprise a plurality of strip electrodes spatially mounted with respect to each other parallel to said grid-structured first electrode with said grid-structured first electrode between said strip electrodes and said accelerator beam, and means for measuring ion current in each of said strip electrodes, and further including a grid-structured third electrode between said first electrode and said strip electrodes, and wherein said voltage means generate and apply a voltage to said electrodes to accelerate said residual gas ions to said strip electrodes.

12. The apparatus according to claim 11 wherein said grid-structured first electrode is at ground potential, said voltage means apply a positive voltage to said second electrode and a negative voltage to said grid-structured third electrode, and means for maintaining said strip electrodes at approximately ground potential, whereby positive ions from said residual gas ions are accelerated to said strip electrodes.

References Cited

UNITED STATES PATENTS

| | | | |
|---|---|---|---|
| 2,642,535 | 6/1953 | Schroeder | 250—41.9 |
| 3,170,116 | 2/1965 | Farrington | 324—70 |
| 3,207,982 | 9/1965 | Rose | 324—71 |
| 3,209,201 | 9/1965 | Anger | 315—9 |
| 3,209,201 | 9/1965 | Anger | 315—9 |
| 3,341,770 | 9/1967 | Lloyd | 324—33 |
| 3,371,274 | 2/1968 | Davey | 324—71 |

GERALD R. STRECKER, Primary Examiner

U.S. Cl. X.R.

250—41.9, 49.5; 324—71